United States Patent
Toba et al.

(10) Patent No.: US 8,554,383 B2
(45) Date of Patent: Oct. 8, 2013

(54) POWER SUPPLY AND DEMAND CONTROL APPARATUS AND POWER SUPPLY AND DEMAND CONTROL METHOD

(75) Inventors: Koji Toba, Tama (JP); Takenori Kobayashi, Kawasaki (JP); Yoshihiro Ogita, Fuchu (JP); Akinori Nishi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 12/994,806

(22) PCT Filed: Apr. 9, 2009

(86) PCT No.: PCT/JP2009/057246
§ 371 (c)(1),
(2), (4) Date: Feb. 11, 2011

(87) PCT Pub. No.: WO2009/145010
PCT Pub. Date: Dec. 3, 2009

(65) Prior Publication Data
US 2011/0137482 A1 Jun. 9, 2011

(30) Foreign Application Priority Data
May 26, 2008 (JP) ................................. 2008-136677

(51) Int. Cl.
*G05D 3/12* (2006.01)
(52) U.S. Cl.
USPC ........................... 700/291; 700/295; 700/297
(58) Field of Classification Search
USPC .................................. 700/286, 291, 295, 297
See application file for complete search history.

(56) References Cited

FOREIGN PATENT DOCUMENTS

| JP | 2003 32889 | 1/2003 |
|---|---|---|
| JP | 2004 48852 | 2/2004 |
| JP | 2004 56996 | 2/2004 |

OTHER PUBLICATIONS

International preliminary Report on Patentability and Written Opinion issued Jan. 11, 2011, in International Patent Application No. PCT/JP2009/057246 (International Filing date Apr. 9, 2009).
International Search Report issued Jul. 14, 2009 in PCT/JP09/057246 filed Apr. 9, 2009.

*Primary Examiner* — Carlos Ortiz Rodriguez
(74) *Attorney, Agent, or Firm* — Oblon, Spivak, McClelland, Maier & Neustadt, L.L.P.

(57) ABSTRACT

A power supply and demand control apparatus includes a power generation planning unit that calculates one day's power outputs of multiple distributed power sources and a power flow target of a linking point to another power system, a long-cycle control unit having a long-cycle supply-demand balancing control unit that performs control every few minutes so as to ensure the supply-demand balancing of electric energy in a given amount of time at the linking point in order to perform control for making deviations between total power output calculated by the power generation planning unit and load power in the power system constant, and a short-cycle control unit having a short-cycle supply-demand balancing control unit that performs similar control every few seconds. In the power supply and demand control apparatus, the long-cycle control unit and short-cycle control unit perform the supply-demand balancing control in a hierarchical fashion to determine output assignments of the distributed power sources.

5 Claims, 9 Drawing Sheets

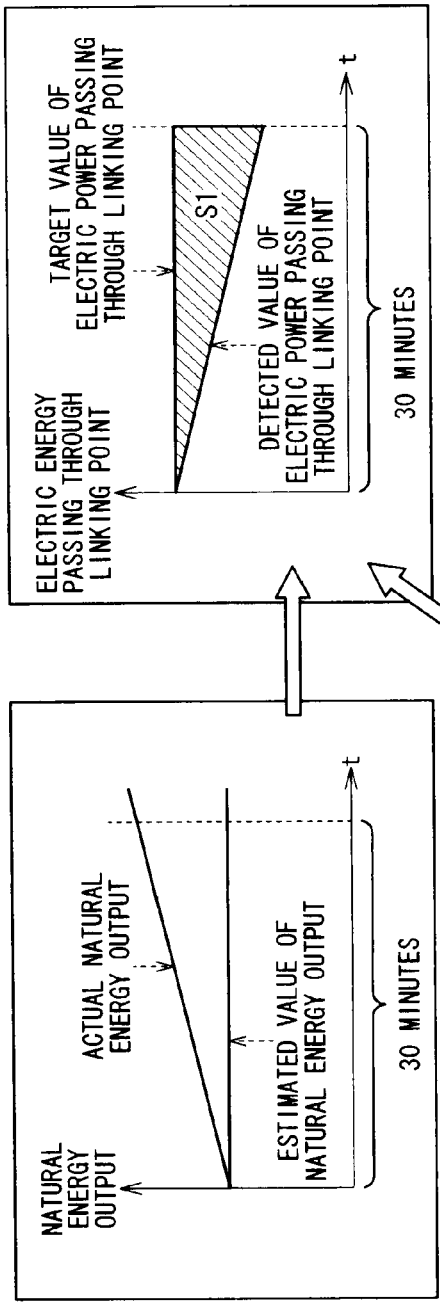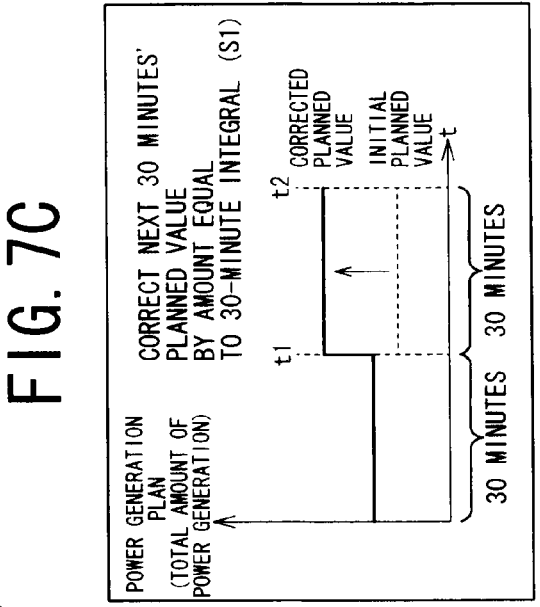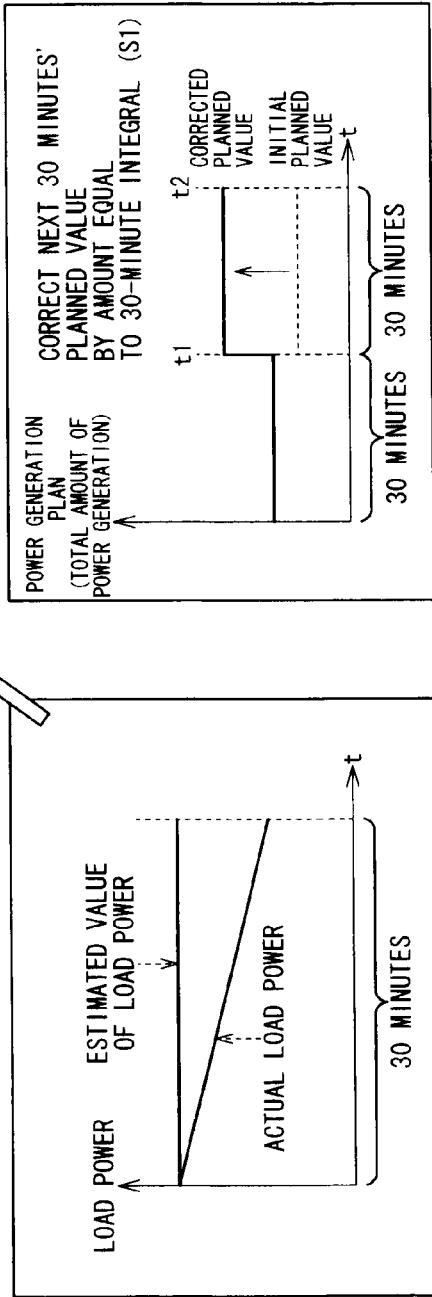

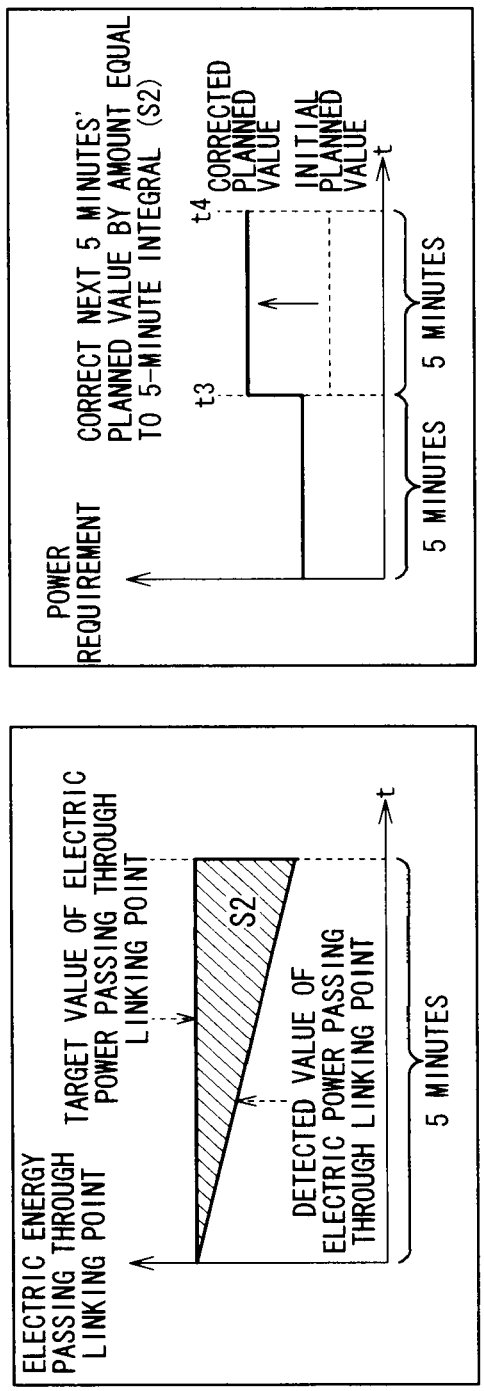

POWER SUPPLY AND DEMAND CONTROL APPARATUS AND POWER SUPPLY AND DEMAND CONTROL METHOD

TECHNICAL FIELD

The present invention relates to apparatus and method which perform control so as to keep electric power flow constant, and in particular, relates to a power supply and demand (supply-demand) control apparatus and power supply and demand (supply-demand) control method which control supply-demand balancing.

BACKGROUND ART

There is a small-scale power system, known as a microgrid or the like, which supplies power to customers in a specified region using multiple types of distributed power source installed in the specified region, including engine generators, turbine generators, power storage systems, fuel cells, and photovoltaic generation, wind-power generation, or other natural energy generation apparatus.

When a small-scale power system is connected to a commercial power system of an electric power company, there includes either one of two methods, i.e., one: forward power flow which involves receiving power from the commercial power system, and the other: reverse power flow which involves supplying power to the commercial power system. In each method, it is required to perform power supply and demand control of distributed power sources in the small-scale power system in order to keep the electric power flow (electric energy) at any given location in a power system constant or keep deviations between load power and power output in the small-scale power system constant.

To realize power supply and demand control of multiple distributed power sources, it is necessary to estimate load power, calculate such total power output of the distributed power sources that will keep deviations between the estimate load power and power output constant and to assign the total power output as power output targets among the distributed power sources.

For example, Patent Document 1 (Japanese Patent Laid-Open No. 2004-48852) discloses a power generation planning method for planning an amount of power to be generated by each generator set for electricity supply from a generator-set group made up of a plurality of generator sets to a consumer group of one or more consumers in such a way as to optimize predetermined evaluation values while satisfying limiting conditions that estimated total received power of the entire consumer group will be accommodated and that total reserve capacity for a total amount of power planned to be generated by the entire generator set group will be equal to or higher than predetermined total reserve capacity.

Further, if a small-scale system includes a natural energy generation apparatus whose power output is affected by insolation, wind conditions or other natural conditions, it is necessary to calculate the total power output of distributed power sources other than the natural energy generation apparatus by taking into consideration an estimated value of the power output and estimated value of load power of the natural energy generation apparatus.

For example, Patent Document 2 (Japanese Patent Laid-Open No. 2004-289918) discloses a method for realizing power generation estimation based on weather information. The method estimates amounts of power to be generated by photovoltaic generation and wind-power generation in each area, a day ahead or in real time, by gathering weather information concerning sunshine and wind force.

Power output command values are issued to distributed power sources to perform power supply and demand control in order to keep the electric power flow (electric energy) at any given location in a power system constant or keep deviations between load power and power output in the small-scale power system constant. Specifically, the total power output of the distributed power sources in the target system is calculated based on the estimations of loads and the power output of the natural energy generation apparatus, and a power output command value is determined for each distributed power source using economical load dispatching (hereinafter abbreviated to ELD) so as to achieve greater economy and realize the total power output.

Rules used to keep the electric power flow at any given location in a power system constant include a rule known as supply-demand balancing which involves evaluating how actual electric energy deviates from target electric energy in a given amount of time, and it is necessary to control output of the distributed power sources in the small-scale power system so as to achieve required supply-demand balancing.

In small-scale power systems, as in the case of medium- or large-scale power systems, if there is any difference between the estimated values and the actual values of the load power (actual values) or between the estimated values and the actual values of the power output of the natural energy generation apparatus, it is necessary to achieve the supply-demand balancing at any given location by modifying power output commands of the generation apparatus which lend themselves to power control, so as to eliminate the difference.

Performance in the supply-demand balancing is evaluated in terms of how quickly the supply-demand balancing can be achieved when any difference arises between the estimated values and the actual values of load power (actual values) or between the estimated values and the actual values of the power output of a natural energy generation apparatus, and it is known that large electric power companies generally supply electric power by achieving 30-minute supply-demand balancing.

However, small-scale power systems such as microgrids are subject to large fluctuations in the power generation due to reliance on the natural energy generation apparatus and because of limited demand. Therefore, it is more difficult for the small-scale power systems to achieve the supply-demand balancing in short time periods than for medium- or large-scale power systems. Thus, the small-scale power systems such as microgrids require a power supply and demand (supply-demand) control apparatus and power supply and demand (supply-demand) control method with the supply-demand balancing performance higher than those for the medium- or large-scale power systems.

DISCLOSURE OF THE INVENTION

In view of the circumstances encountered in the conventional techniques mentioned above, an object of the present invention is to provide a power supply and demand control apparatus and a power supply and demand control method which can ensure supply-demand balancing of electric energy at any given location approximately every few tens of minutes as well as ensure supply-demand balancing in shorter cycles when any difference arises between estimated values and actual values of load power or between estimated values and actual values of power output of a natural energy generation apparatus, in a small-scale power system.

Then, in order to solve the above matters, as described in the appended claims, the present invention provides, in one aspect, a power supply and demand control apparatus which adjusts power outputs of distributed power sources having adjustable power outputs out of a plurality of distributed power sources connected in a power system to thereby keep deviations between total power output and load power of the distributed power sources in the power system constant, the power supply and demand control apparatus comprising:

a power generation planning unit that calculates one day's power output of each of the distributed power sources and a target for electric power flow at an electric power flow measuring location set arbitrarily;

a first control unit that generates a control signal used to make the deviations between the total power output and the load power constant; and a second control unit that generates a control signal used to perform control for making the deviations between the total power output and the load power constant on a shorter cycle than a control cycle of the first control unit, wherein the first control unit comprises:

a first supply-demand balancing control unit that corrects the electric power flow target calculated by the power generation planning unit so as to eliminate the deviations between the total power output of the distributed power sources and the load power in the power system to thereby ensure supply-demand balancing of electric energy in a given amount of time at the electric power flow measuring location, a load power estimating unit that estimates the load power, a non-variable output estimating unit that estimates power output of a non-variable output power source having power output not adjustable out of the distributed power sources installed in the power system, a power requirement calculating unit that calculates a required value of the total power output based on a target value of the electric power flow corrected by the first supply-demand balancing control unit, an estimated load power value produced by the load power estimating unit and an estimated power output value of the non-variable output power source produced by the non-variable output estimating unit, and an ELD unit that determines economical load dispatching based on the required value of the total power output calculated by the power requirement calculating unit and produce the respective power output command values for the plurality of distributed power sources; and the second control unit comprises:

a second supply-demand balancing control unit that corrects and outputs the electric power flow target corrected by the first supply-demand balancing control unit so as to eliminate the deviations between the total power output of the distributed power sources and the load power of the power system and ensure the supply-demand balancing in a period shorter than a supply-demand balancing period ensured by the first supply-demand balancing control unit, and a short-cycle output assignment unit that allocates control amounts requested by the second supply-demand balancing control unit among the distributed power sources having the adjustable outputs.

Furthermore, in order to solve the above matters, as described in the appended claims, the present invention also provides, in another aspect, a power supply and demand control method for adjusting power outputs of distributed power sources having adjustable power outputs out of a plurality of distributed power sources connected in a power system to thereby keep deviations between total power output and load power of the distributed power sources in the power system constant, the power supply and demand control method comprising:

a power generation planning step of calculating one day's power output of each of the distributed power sources and a target for electric power flow at an electric power flow measuring location set in advance;

a first control step of generating a control signal used to make the deviations between the total power output and the load power constant; and a second control step of generating a control signal used to perform control for making the deviations between the total power output and the load power constant on a shorter cycle than a control cycle of the first control step, wherein the first control step comprises:

a first supply-demand balancing control step of correcting the electric power flow target calculated by the power generation planning step, so as to eliminate the deviations between the total power output of the distributed power sources and the load power in the power system to thereby ensure supply-demand balancing of electric energy in a given amount of time at the electric power flow measuring location, a load power estimating step of estimating the load power, a non-variable output estimating step of estimating power output of a non-variable output power source having power output not adjustable out of the distributed power sources installed in the power system, a power requirement calculating step of calculating a required value of the total power output based on a target value of power flow corrected by the first supply-demand balancing control step and an estimated power output value of the non-variable output power source produced by the non-variable output estimating step, and an ELD step of determining economical load dispatching based on the required value of the total power output calculated by the power requirement calculating step and producing respective power output command values for the plurality of distributed power sources; and the second control step comprises:

a second supply-demand balancing control step of correcting and outputting the electric power flow target corrected by the first supply-demand balancing control step, so as to eliminate the deviations between the total power output of the distributed power sources and the load power of the power system and ensure supply-demand balancing in shorter periods than a supply-demand balancing period ensured by the first supply-demand balancing control step, and a short-cycle output assignment step of allocating control amounts calculated in the second supply-demand balancing control step among the distributed power sources having adjustable power outputs.

Furthermore, the power supply and demand control apparatus and the power supply and demand control method according to the present invention provided with the features described above include many preferred embodiments described later herein in the description of the embodiments.

The power supply and demand control apparatus and power supply and demand control method according to the present invention perform control so as to ensure the supply-demand balancing of the electric energy at any given location including a linking point between a power system to which the present invention is applied and another power system approximately every few tens of minutes as well as ensure the supply-demand balancing in shorter cycles (approximately every few minutes). Accordingly, the power supply and demand control apparatus and the power supply and demand control method according to the present invention can improve the supply-demand balancing performance compared to the conventional power supply and demand control apparatus and methods.

BRIEF DESCRIPTION OF THE DRAWINGS

FIG. 7 includes FIGS. 7A to 7D which are explanatory diagrams illustrating an example of how linking point planned power flow target values are corrected by the power supply and demand control apparatus according to the third embodiment of the present invention.

FIG. 9 includes FIGS. 9A and 9B which are explanatory diagrams illustrating an example of how power requirements are corrected by the power supply and demand control apparatus according to the fourth embodiment of the present invention.

BEST MODE FOR CARRYING OUT THE INVENTION

A power supply and demand control apparatus and the power supply and demand control method according to the present invention will be described below with reference to the accompanying drawings.

Figure 1:
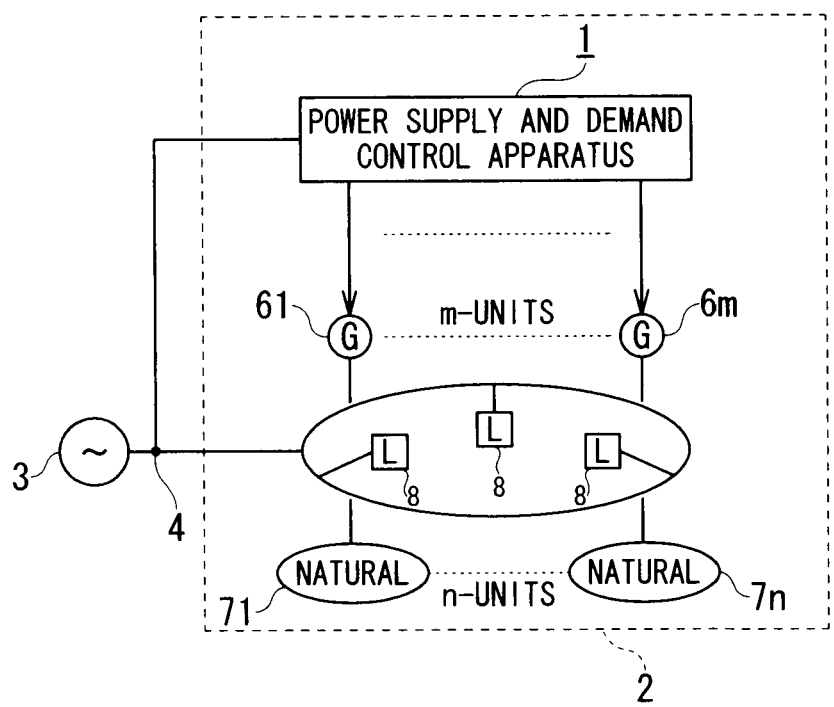
FIG. 1 is an explanatory diagram illustrating an example of how a power supply and demand control apparatus 1 according to the present invention is applied to a power system 2.

FIG. 1 is an explanatory diagram illustrating an example of how a power supply and demand control apparatus 1 according to the present invention is applied to a power system 2.

The power supply and demand control apparatus 1 shown in FIG. 1 performs power supply and demand control for a small-scale power system 2 known as a microgrid or the like. The small-scale power system 2 to which the power supply and demand control apparatus 1 is applied is connected with another power system (external power system) 3 at a linking point 4. The power supply and demand control apparatus 1 detects power flow (electric energy) at the linking point 4, controls the power output of distributed power sources 61 to 6m having a controllable power output (hereinafter referred to as distributed variable output power sources) in multiple distributed power sources 61 to 6m and 71 to 7n (where "m" and "n" are optional integers equal to or larger than 2) installed in the power system 2, based on a detected value of the detected power flow, thereby achieving the supply-demand balancing control.

Details of the power supply and demand control apparatus 1 will be described in individual embodiments below.

Reference numerals 71 to 7n denote distributed power sources (distributed non-variable output power sources) whose power output cannot be controlled variably. These power sources include, for example, photovoltaic generation, wind-power generation, and other natural energy generation apparatus (hereinafter referred to as natural energy power sources). Reference numeral 8 denotes a load-consuming facility connected in the power system 2 which is subjected to the power supply and demand control.

First Embodiment

A power supply and demand control apparatus and a power supply and demand control method (hereinafter referred to as first power supply and demand control apparatus and first power supply and demand control method, respectively) according to a first embodiment of the present invention will be described.

Figure 2:
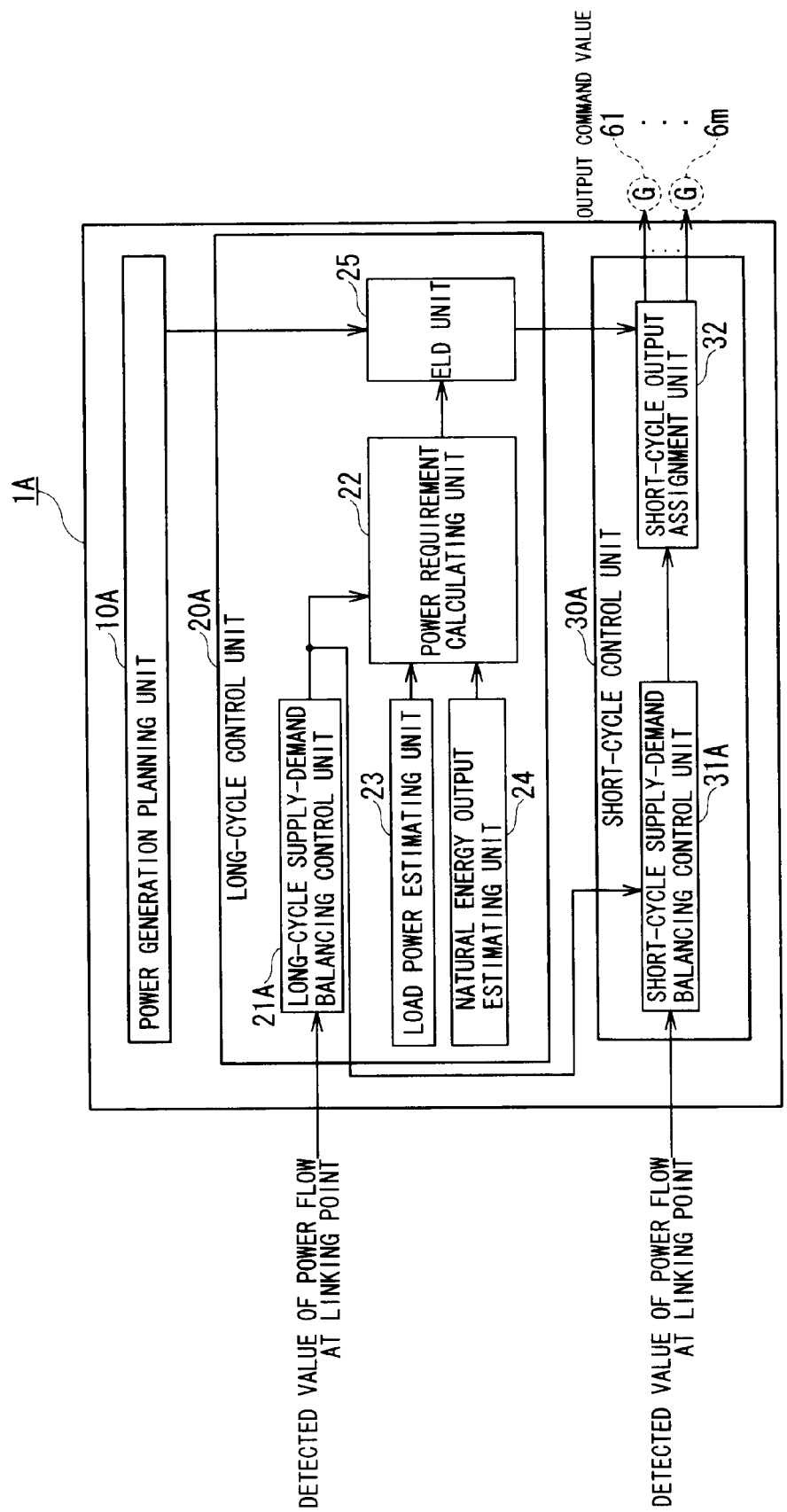
FIG. 2 is a block diagram schematically showing a configuration of a power supply and demand control apparatus according to a first embodiment of the present invention.

FIG. 2 is a block diagram schematically showing a configuration of the power supply and demand control apparatus (first power supply and demand control apparatus) 1A according to the first embodiment of the present invention.

As shown in FIG. 2, the power supply and demand control apparatus 1A includes a power generation planning unit 10A, long-cycle control unit 20A, and short-cycle control unit 30A. In the power supply and demand control apparatus 1A shown in FIG. 2, the long-cycle control unit 20A in turn includes a long-cycle supply-demand balancing control unit 21A, a power requirement calculating unit 22, a load power estimating unit 23, a natural energy output estimating unit 24, and an ELD unit 25.

On the other hand, the short-cycle control unit 30A includes a short-cycle supply-demand balancing control unit 31A and a short-cycle output assignment unit 32.

The power generation planning unit 10A of the power supply and demand control apparatus 1A calculates one day's planned power output value of each of the distributed variable output power sources 61 to 6m as well as planned values of target power (power flow target) at the linking point 4 (hereinafter referred to as planned power flow target values) based on a past load power of the power system 2 shown in FIG. 1 and a past record of power output from the natural energy power sources 7. One day's planned power output value of each of the distributed variable output power sources 61 to 6m and the planned power flow target values at the linking point 4 are calculated at predetermined time intervals of, for example, 30 minutes.

The power generation planning unit 10A outputs the calculated values, i.e., one day's planned power output value of each of the distributed variable output power sources 61 to 6m and the planned power flow target values at the linking point 4, to the long-cycle control unit 20A. More specifically, one day's planned power output values of the distributed variable output power sources 61 to 6m are sent from the power generation planning unit 10A to the ELD unit 25 while the planned power flow target values at the linking point 4 are sent from the power generation planning unit 10A to the long-cycle supply-demand balancing control unit 21.

The long-cycle supply-demand balancing control unit 21A of the long-cycle control unit 20A corrects the power flow target of the linking point 4, as required, based on the planned power flow target values at the linking point 4 and measured values (detected values) of the power flow detected at the linking point 4, to thereby achieve the supply-demand balancing in a cycle of, for example, approximately 30 minutes.

Calculated correction values of the power flow target (hereinafter referred to as long-cycle correction values) are sent to the power requirement calculating unit 22 and the short-cycle supply-demand balancing control unit 31A of the short-cycle control unit 30A.

The power requirement calculating unit 22 calculates a total amount of power required to be generated by the distributed variable output power sources 61 to 6m (shown in FIG. 1) based on the long-cycle correction values of the power flow target received from the long-cycle supply-demand balancing control unit 21A, estimated values (hereinafter referred to as estimated load power values) received from the load power estimating unit 23, and estimated values (hereinafter referred to as estimated natural energy output values) received from the natural energy output estimating unit 24.

The estimated load power values are the estimated values of the load power of the load-consuming facilities 8 shown in FIG. 1. Further, the estimated natural energy output values are estimated output values of the natural energy power sources 71 to 7m shown in FIG. 1.

The load power estimating unit 23 has a capability to estimate the load power of the load-consuming facilities 8 (FIG. 1). The load power estimating unit 23 calculates estimated load power values using this capability and sends the estimated load power values thus calculated to the power requirement calculating unit 22.

On the other hand, the natural energy output estimating unit 24 has a capability to estimate outputs of the natural energy power sources 71 to 7m (FIG. 1). The natural energy output estimating unit 24 calculates estimated natural energy output values using this capability and sends the estimated natural energy output values thus calculated to the power requirement calculating unit 22.

Some of known techniques may be used for the calculation of the estimated load power values and the calculation of reliability of the calculated estimated values in the load power estimating unit 23 as well as the calculation of the estimated natural energy output values and the calculation of reliability of the calculated estimated values in the natural energy output estimating unit 24, where the known techniques include methods by the application of a prediction model which uses a linear combination of past variables for estimation such as a method described in Japanese Patent Application No. 2007-113031 (Japanese Patent Application Laid-open Publication No. 2008-271723).

The ELD unit 25 determines the power output of each of the distributed variable output power sources 61 to 6m so as to keep the electric power flow (electric energy) at the linking point 4 (shown in FIG. 1) constant based on the planned values of the power outputs (for one day) of the distributed variable output power sources 61 to 6m and the total amount of power required to be generated by the distributed variable output power sources 61 to 6m, where the planned values of the power output have been received from the power generation planning unit 10A and the amount of required power has been calculated by the power requirement calculating unit 22.

The ELD unit 25 determines the power outputs of the respective distributed variable output power sources 61 to 6m in such a way of achieving a greater economy and providing required total power output. Then, the ELD unit 25 sends the determined power output values of the respective distributed variable output power sources 61 to 6m to the short-cycle output assignment unit 32 of the short-cycle control unit 30A.

In order to achieve the supply-demand balancing on a shorter cycle (e.g., in a cycle of approximately 5 minutes) than the cycle set by the long-cycle supply-demand balancing control unit 21A to ensure the supply-demand balancing, the short-cycle supply-demand balancing control unit 31A of the short-cycle control unit 30A corrects the power flow target of the linking point 4, as required, based on the long-cycle correction values of the power flow target of the linking point 4 received from the long-cycle supply-demand balancing control unit 21A and the measured values (detected values) of power flow detected at the linking point 4. The calculated correction values of the power flow target (hereinafter referred to as short-cycle correction values) are sent to the short-cycle output assignment unit 32.

The short-cycle output assignment unit 32 determines the power output values of the respective distributed variable output power sources 61 to 6m based on the power output values of the respective distributed variable output power sources 61 to 6m received from the ELD unit 25 of the long-cycle control unit 20A and the short-cycle correction values received from the short-cycle supply-demand balancing control unit 31A.

That is, the short-cycle output assignment unit 32 determines the power outputs of the respective distributed variable output power sources 61 to 6m such that the power flow target will match the short-cycle correction values calculated in the short-cycle supply-demand balancing control unit 31A while maintaining power output sharing ratio among the distributed variable output power sources 61 to 6m received from the ELD unit 25 and outputs the determined power outputs as command values to the respective distributed variable output power sources 61 to 6m.

Next, the long-cycle supply-demand balancing control unit 21A of the long-cycle control unit 20A and the short-cycle supply-demand balancing control unit 31A of the short-cycle control unit 30A will be described in more detail with reference to FIGS. 3 and 4.

Figure 3:
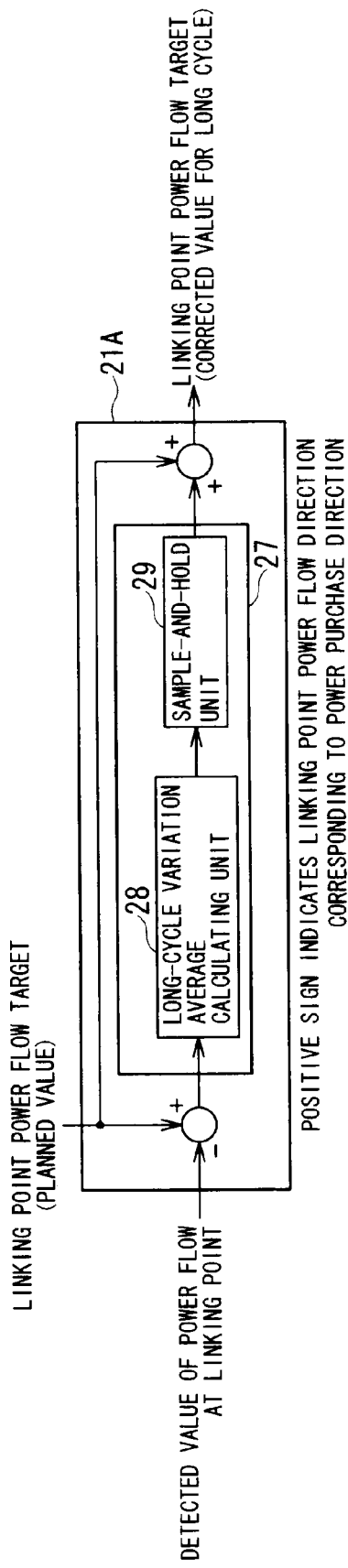
FIG. 3 is a block diagram schematically showing a configuration of a long-cycle supply-demand balancing control unit of the power supply and demand control apparatus according to the first embodiment of the present invention.
Figure 4:
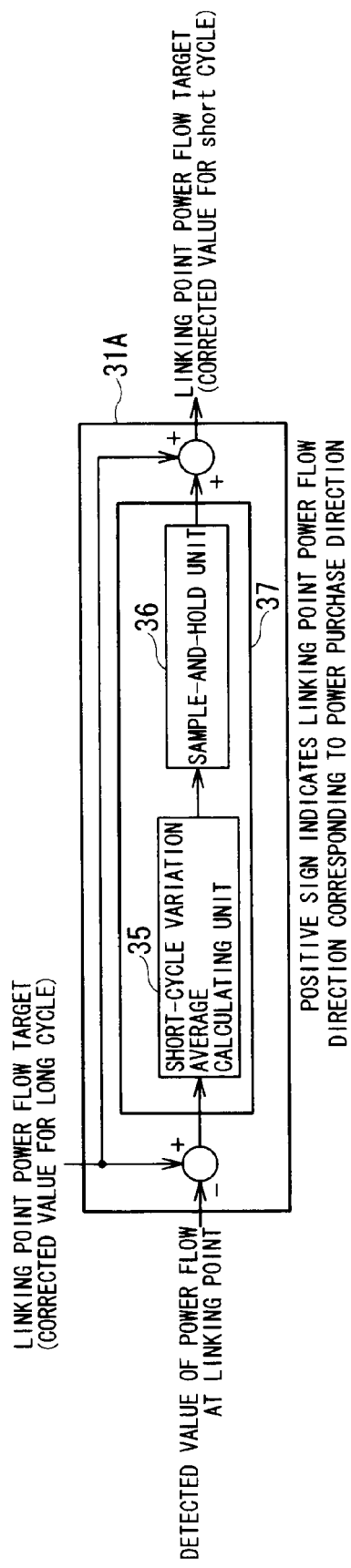
FIG. 4 is a block diagram schematically showing a configuration of a short-cycle supply-demand balancing control unit of the power supply and demand control apparatus according to the first embodiment of the present invention.

FIG. 3 is a block diagram schematically showing a configuration of the long-cycle supply-demand balancing control unit 21A and FIG. 4 is a block diagram schematically showing a configuration of the short-cycle supply-demand balancing control unit 31A. The positive (+) and negative (−) signs shown in FIGS. 3 and 4 indicate a direction of power flow at the linking point 4 (FIG. 1), where a power purchase direction (along the direction of flow into the power system 2) is designated to be positive.

As shown in FIG. 3, the long-cycle supply-demand balancing control unit 21A includes a long-cycle correction value calculating unit 27 which calculates the long-cycle correction values of the power flow target of the linking point 4 if the measured values of the power flow detected at the linking point 4 deviate from the planned values of the power flow target of the linking point 4 received from the power generation planning unit 10A. In order to achieve the supply-demand balancing on a set long cycle, the long-cycle correction value calculating unit 27 performs the control so as to correct the power flow target of the linking point 4 on a cycle (hereinafter referred to as a correction cycle) $1/10$ to $1/3$ the long cycle.

The long-cycle correction value calculating unit 27 shown in FIG. 3 includes a long-cycle variation average calculating unit 28 which calculates deviations between the planned power flow target values at the linking point 4 and the actual detected values and calculates averages on a correction cycle set in advance, and a sample/hold unit 29 which performs a sample-and-hold process in the set correction cycle. A correction cycle of approximately 5 minutes is set in order for the long-cycle supply-demand balancing control unit 21A shown in FIG. 3 to thereby achieve the 30-minute supply-demand balancing.

The short-cycle supply-demand balancing control unit 31A shown in FIG. 4 is configured similarly to the long-cycle supply-demand balancing control unit 21A shown in FIG. 3 and performs substantially the same processes as those in the long-cycle supply-demand balancing control unit 21A, differing only in that a shorter cycle is used to achieve the supply-demand balancing. That is, the short-cycle supply-demand balancing control unit 31A includes a short-cycle correction value calculating unit 37 which in turn includes a short-cycle variation average calculating unit 35 and a sample/hold unit 36. The short-cycle supply-demand balancing control unit 31A shown in FIG. 4 uses any time period (e.g., 1 minute) shorter than the correction cycle (e.g., 5 minutes) of the long-cycle supply-demand balancing control unit 21A.

Next, the first power supply and demand control method will be described.

The first power supply and demand control method is performed, for example, as the first power supply and demand control apparatus 1A shown in FIG. 2 performs a power supply and demand control procedure (hereinafter referred to as a first power supply and demand control procedure). Individual processing steps of the first power supply and demand control procedure will be described below with reference to FIG. 2.

In the first power supply and demand control procedure, first, the power generation planning unit 10A of the first power supply and demand control apparatus 1A carries out a power generation planning step to thereby calculates one day's planned power output value of each of the distributed variable output power sources 61 to 6m and planned power flow target values at the linking point 4. This power generation planning step includes: calculating the planned power output values of the distributed variable output power sources; and calculating planned power flow target values.

Once, the power generation planning step has been completed, the long-cycle control unit 20A carries out a long-cycle supply-demand balancing control process which includes a long-cycle correction value calculating step, a power requirement calculating step and an ELD step. The long-cycle supply-demand balancing control step, when carried out, determines the power outputs of the respective distributed variable output power sources 61 to 6m, which are to be controlled in order to achieve supply-demand balancing on a predetermined long cycle.

Now, the long-cycle supply-demand balancing control step will be described in more detail. First, the long-cycle supply-demand balancing control unit 21A carries out the long-cycle correction value calculating step to calculate long-cycle correction values of the power flow target needed in order to correct the power flow target of the linking point 4, based on the planned power flow target values calculated in the step of calculating planned power flow target values and the measured values (detected values) of the power flow.

Next, the power requirement calculating unit 22 carries out the power requirement calculating step to calculate the total amount of power required to be generated by the distributed variable output power sources 61 to 6m, based on the long-cycle correction values of the power flow target calculated in the long-cycle correction value calculating step as well as on the estimated load power values and estimated natural energy output values.

Then, the ELD unit 25 carries out the ELD step to determine the respective power outputs of the distributed variable output power sources 61 to 6m based on the total amount of power required to be generated by the distributed variable output power sources 61 to 6m calculated in the power requirement calculating step and one day's planned power output value of each of the distributed variable output power sources 61 to 6m calculated in the power generation planning step.

The long-cycle supply-demand balancing control step has been once completed, the short-cycle control unit 30A carries out a short-cycle correction value calculating step which includes a short-cycle correction value calculating step and short-cycle output assignment step.

The short-cycle supply-demand balancing control step, when carried out, determines the power outputs of the respective distributed variable output power sources 61 to 6m, which are to be controlled in order to achieve short-cycle supply-demand balancing on a predetermined short cycle.

Now, the short-cycle supply-demand balancing control step will be described in more detail. First, the short-cycle supply-demand balancing control unit 31A carries out the short-cycle correction value calculating step to calculate the short-cycle correction values of the power flow target needed in order to correct the power flow target of the linking point 4, based on the long-cycle correction values of the power flow target calculated in the long-cycle correction value calculating step and the measured values (detected values) of the power flow.

Next, the short-cycle output assignment unit 32 carries out the short-cycle output assignment step, thereby determining the power outputs of the respective distributed variable output power sources 61 to 6m based on the short-cycle correction values of the power flow target of the linking point 4 calculated in the short-cycle correction value calculating step and the power output values of the respective distributed variable output power sources 61 to 6m calculated in the ELD step, and then, outputs the determined power outputs as command values to the respective distributed variable output power sources 61 to 6m.

According to the first embodiment of the present invention, the long-cycle control unit 20A and short-cycle control unit 30A can perform the supply-demand balancing control in a hierarchical fashion. Specifically, the long-cycle supply-demand balancing control unit 21A corrects the target power every 5 minutes to ensure, for example, the 30-minute supply-demand balancing while the short-cycle supply-demand balancing control unit 31A corrects the target power every 1 minute to achieve, for example, the 5-minute supply-demand balancing. Thus, the first embodiment ensures that the short-cycle control unit 30A achieves the supply-demand balancing further in short time periods while the long-cycle control unit 20A achieves the supply-demand balancing in a long cycles (e.g., in 30-minute cycles). That is, the first embodiment can improve the supply-demand balancing performance compared to the conventional power supply and demand control apparatus and the power supply and demand control method.

Incidentally, although in the present embodiment, the supply-demand balancing cycle and correction cycle set by the long-cycle supply-demand balancing control unit 21A and the short-cycle supply-demand balancing control unit 31A are described as being 30 minutes and 5 minutes, or 5 minutes and 1 minute as an example, the set values of the supply-demand balancing cycles are not limited to the values described above as long as the set value of the long cycle is larger than the set value of the short cycle. This similarly applies to the other embodiments described later.

Second Embodiment

A power supply and demand control apparatus and a power supply and demand control method (hereinafter referred to as a second power supply and demand control apparatus and a second power supply and demand control method, respectively) according to a second embodiment of the present invention will be described with reference to FIG. 5.

Figure 5:
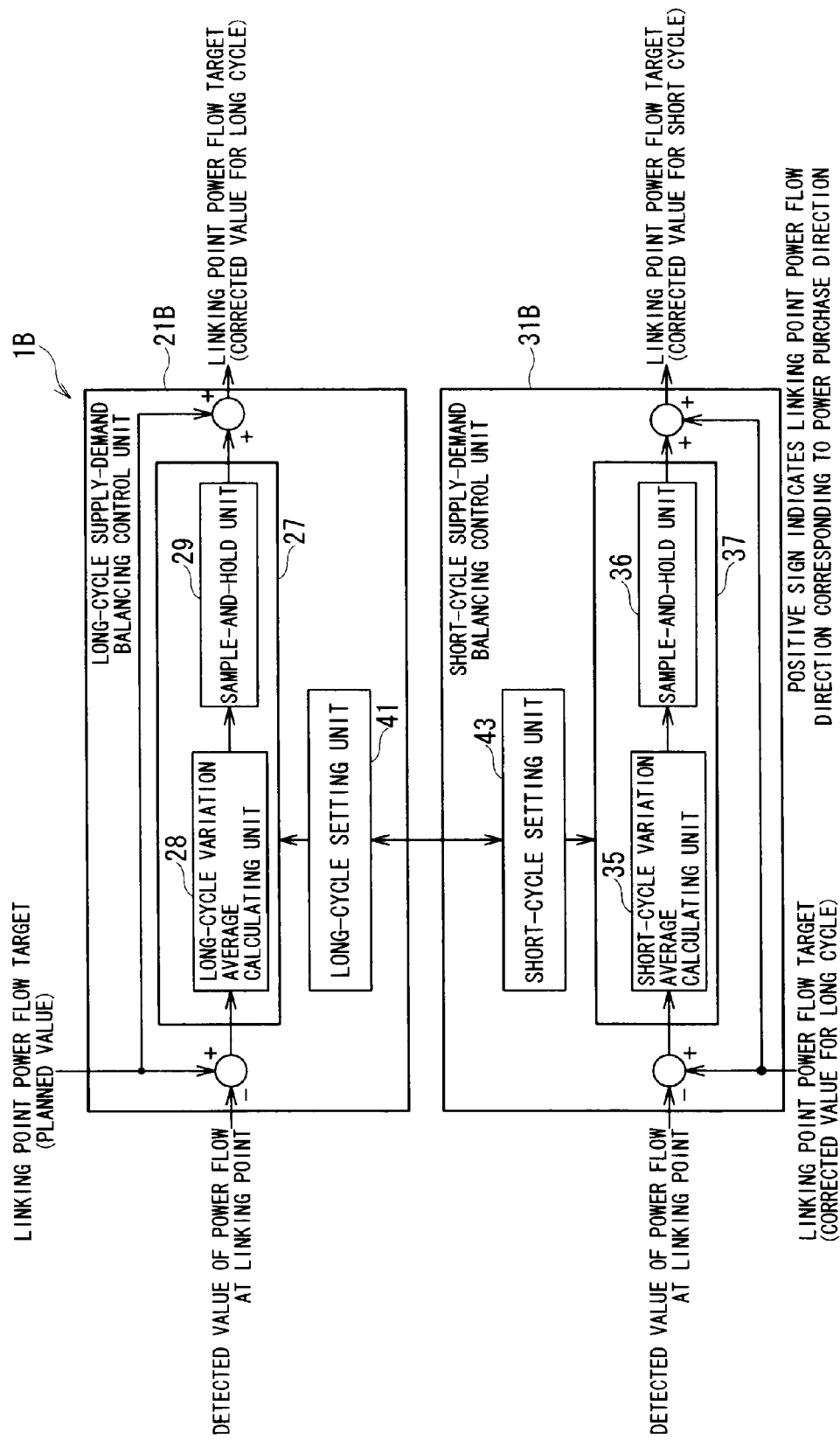
FIG. 5 is a block diagram schematically showing a configuration of a power supply and demand control apparatus according to a second embodiment of the present invention.

FIG. 5 is a block diagram schematically showing a configuration of the power supply and demand control apparatus (second power supply and demand control apparatus) 1B according to the second embodiment of the present invention, and more specifically, a long-cycle supply-demand balancing control unit 21B and the short-cycle supply-demand balancing control unit 31B of the second power supply and demand control apparatus 1B.

The second power supply and demand control apparatus 1B shown in FIG. 5 is equipped with the long-cycle supply-demand balancing control unit 21B and the short-cycle supply-demand balancing control unit 31B instead of the long-cycle supply-demand balancing control unit 21A of the long-cycle control unit 20A and the short-cycle supply-demand balancing control unit 31A of the short-cycle control unit 30A of the first embodiment, but is otherwise substantially the same as the power supply and demand control apparatus 1A of the first embodiment. Thus, the present second embodiment will be described, focusing on a long-cycle control unit 20B and short-cycle control unit 30B. Components substantially the same as those of the power supply and demand control apparatus 1A of the first embodiment shown in FIG. 2 are denoted by the same reference numerals as the corresponding components of the power supply and demand control apparatus 1A, and duplicated description thereof will be omitted herein.

The second power supply and demand control apparatus 1B shown in FIG. 5 includes the power generation planning unit 10A, not shown in FIG. 5, the long-cycle control unit 20B, and the short-cycle control unit 30B. The long-cycle control unit 20B in turn includes the long-cycle supply-demand balancing control unit 21B, the power requirement calculating unit 22, the load power estimating unit 23, the natural energy output estimating unit 24, and the ELD unit 25 while the short-cycle control unit 30B includes the short-cycle supply-demand balancing control unit 31B and the short-cycle output assignment unit 32.

As shown in FIG. 5, the long-cycle supply-demand balancing control unit 21B of the long-cycle control unit 20B further includes a long-cycle setting unit 41 which sets a cycle (hereinafter referred to as a long cycle) used to achieve the supply-demand balancing and a correction cycle (hereinafter referred to as a long correction cycle) used to achieve the supply-demand balancing on the set long cycle, in addition to including the long-cycle correction value calculating unit 27 which in turn includes the long-cycle variation average calculating unit 28 and the sample/hold unit 29.

On the other hand, the short-cycle supply-demand balancing control unit 31B of the short-cycle control unit 30B further includes a short-cycle setting unit 43 which sets a cycle (hereinafter referred to as a short cycle) used to achieve the supply-demand balancing and a correction cycle (hereinafter referred to as a short correction cycle) used to achieve the supply-demand balancing on the set short cycle, in addition to including the short-cycle correction value calculating unit 37 which in turn includes the short-cycle variation average calculating unit 35 and the sample/hold unit 36.

The long-cycle setting unit 41 is equipped with an input element and an display element (neither is shown in FIG. 5) which are man-machine interfaces. The user can set or change the long cycle and the long correction cycle via the input element. Furthermore, by visually checking a message displayed on the display element, the user can learn results as to whether or not the long cycle and long correction cycle have been set or changed as being requested.

The long-cycle setting unit 41 has a capability to accept the input of the long cycle and the long correction cycle requested to be set or changed, the capability to determine whether or not the requested values of the long cycle and the long correction cycle are valid, the capability to transmit a command to set the input values as new set values if the requested values of the long cycle and the long correction cycle are valid, the capability to reject the setting request if the requested values of the long cycle and the long correction cycle are invalid, and the capability to report results of setting or changing the long cycle and long correction cycle.

That is, when a new value of the long cycle is inputted, the long-cycle setting unit 41 acquires a current set value of the short cycle from the short-cycle setting unit 43. Then, the long-cycle setting unit 41 compares the new long cycle value with the acquired value. If the inputted long cycle value is larger than the acquired current set value of the short cycle, the long-cycle setting unit 41 determines that the requested value accepted is within an allowable range, and outputs a command value to the long-cycle variation average calculating unit 28, thus instructing the long-cycle variation average calculating unit 28 to set the inputted value as a new long cycle value.

Upon receiving the command value from the long-cycle setting unit 41, the long-cycle variation average calculating unit 28 sets the command value as a new long cycle value. At the same time, the display element displays processing results, reporting that the requested value accepted has been set by the long-cycle variation average calculating unit 28 as the long cycle value used to achieve the supply-demand balancing.

Further, when a new value of the long correction cycle is inputted, the long-cycle setting unit 41 acquires a current set value of the short correction cycle from the short-cycle setting unit 43. Then, the long-cycle setting unit 41 compares the new long correction cycle value with the acquired value. If the inputted long correction cycle value is larger than the acquired current set value of the short correction cycle, the long-cycle setting unit 41 determines that the requested value accepted is within an allowable range, and outputs a command value to the sample-and-hold unit 29, thus instructing the sample/unit 29 to set the inputted value as a new long correction cycle value.

Upon receiving the command value from the long-cycle setting unit 41, the sample/hold unit 29 sets the command value as a new long correction cycle value. At the same time, the display element displays the processing results, reporting that the requested value accepted has been set by the sample/hold unit 29 as the long correction cycle value.

On the other hand, if at least one of the values (long cycle value and long correction cycle value) inputted as new set values is determined to be outside the allowable range, i.e., if the newly inputted long cycle value is smaller than the acquired current set value of the short cycle (the long cycle is shorter than the short cycle) or if the newly inputted long correction cycle value is smaller than the acquired current set value of the short correction cycle, the long-cycle setting unit 41 rejects the setting of the new values on the ground that the input values are invalid requested values and does not transmit a command value. At the same time, the display element displays the processing results, reporting that the input values are invalid requested values.

As in the case of the long-cycle setting unit 41, the short-cycle setting unit 43 is equipped with an input element and display element (neither is shown in FIG. 5) which are man-machine interfaces. The user can set or change the short cycle and the short correction cycle via the input element, and via the display element, the user can learn results as to whether or not the short cycle and short correction cycle have been set or changed as requested.

Furthermore, the short-cycle setting unit 43 attains capabilities equivalent to those of the long-cycle setting unit 41. Specifically, when a new value of the short cycle is inputted, the short-cycle setting unit 43 acquires a current set value of the long cycle from the long-cycle setting unit 41. Then, the short-cycle setting unit 43 compares the new short cycle value with the acquired value. If the inputted short cycle value is smaller than the acquired current set value of the long cycle, the short-cycle setting unit 43 determines that the requested value accepted is within an allowable range, and then outputs a command value to the short-cycle variation average calculating unit 35 to thereby instruct the short-cycle variation average calculating unit 35 so as to set the inputted value as a new short cycle value.

Upon receiving the command value from the short-cycle setting unit 43, the short-cycle variation average calculating unit 35 sets the command value as a new short cycle value. At the same time, the display element displays the processing results, reporting that the requested value accepted has been set by the short-cycle variation average calculating unit 35 as the short cycle value used to achieve the supply-demand balancing.

In the meantime, when a new value of the short correction cycle is inputted, the short-cycle setting unit 43 acquires a current set value of the long correction cycle from the long-cycle setting unit 41. Then, the short-cycle setting unit 43 compares the new short correction cycle value with the acquired value. If the inputted short correction cycle value is smaller than the acquired current set value of the long correction cycle, the short-cycle setting unit 43 determines that the requested value accepted is within an allowable range, and then, outputs a command value to the sample/hold unit 36 to thereby instruct the sample/hold unit 36 to set the inputted value as a new short correction cycle value.

On the other hand, if at least one of the values (short cycle value and short correction cycle value) inputted as new set values is determined to be outside the allowable range, i.e., if the newly inputted short cycle value is larger than the acquired current set value of the long cycle (the short cycle is longer than the long cycle) or if the newly inputted short correction cycle value is larger than the acquired current set value of the long correction cycle, the short-cycle setting unit 43 rejects the setting of the new values on the ground that the input values are invalid requested values and does not transmit a command value. At the same time, the display element displays the processing results, reporting that the input values are invalid requested values.

Being configured, as described above, to allow the user to change the long cycle, the long correction cycle, the short cycle and the short correction cycle depending on the situation, the second power supply and demand control apparatus 1B enables more appropriate control to be performed in response to changing of the circumstances in addition to provision of the same advantages as those of the first power supply and demand control apparatus 1A.

Next, the second power supply and demand control method will be described. The second power supply and demand control method is substantially similar to the first power supply and demand control method except that the user is allowed to change the long cycle, the long correction cycle, the short cycle and the short correction cycle depending on the situation and that the changed long cycle, the long correction cycle, short cycle and the short correction cycle are used after any such change.

The process of changing the long cycle, the long correction cycle, the short cycle and the short correction cycle is as described in relation to the long-cycle setting unit 41 and the short-cycle setting unit 43.

The second embodiment of the present invention allows the long cycle, the long correction cycle, the short cycle and the short correction cycle to be changed at the request of the user. After any such change, the long-cycle supply-demand balancing control step and the short-cycle supply-demand balancing control step are carried out based on the changed long cycle, long correction cycle, short cycle and short correction cycle, enabling more flexible supply-demand balancing control than in the first embodiment.

In addition, since electric energy passing through the linking point 4 can be adjusted to an optional required supply-demand balancing performance, the present invention is applicable without being limited to a predetermined power system. That is, the present invention is applicable to various small-scale power systems which vary in a required supply-demand balancing performance.

Incidentally, the setting of the long correction cycle and short correction cycle may be performed by inputting the value or inputting ratios with the long cycle and the short cycle being references, respectively. Further, installation locations of the long-cycle setting unit 41 and the short-cycle setting unit 43 are not limited to those described above and may be selected freely as long as the capabilities described above can be realized. Furthermore, it is not always necessary that the long-cycle setting unit 41 and the short-cycle setting unit 43 will have separate man-machine interfaces (input element and display element).

Third Embodiment

A power supply and demand control apparatus and a power supply and demand control method (hereinafter referred to as a third power supply and demand control apparatus and a third power supply and demand control method, respectively) according to a third embodiment of the present invention will be described with reference to FIGS. 6 and 7.

Figure 6:
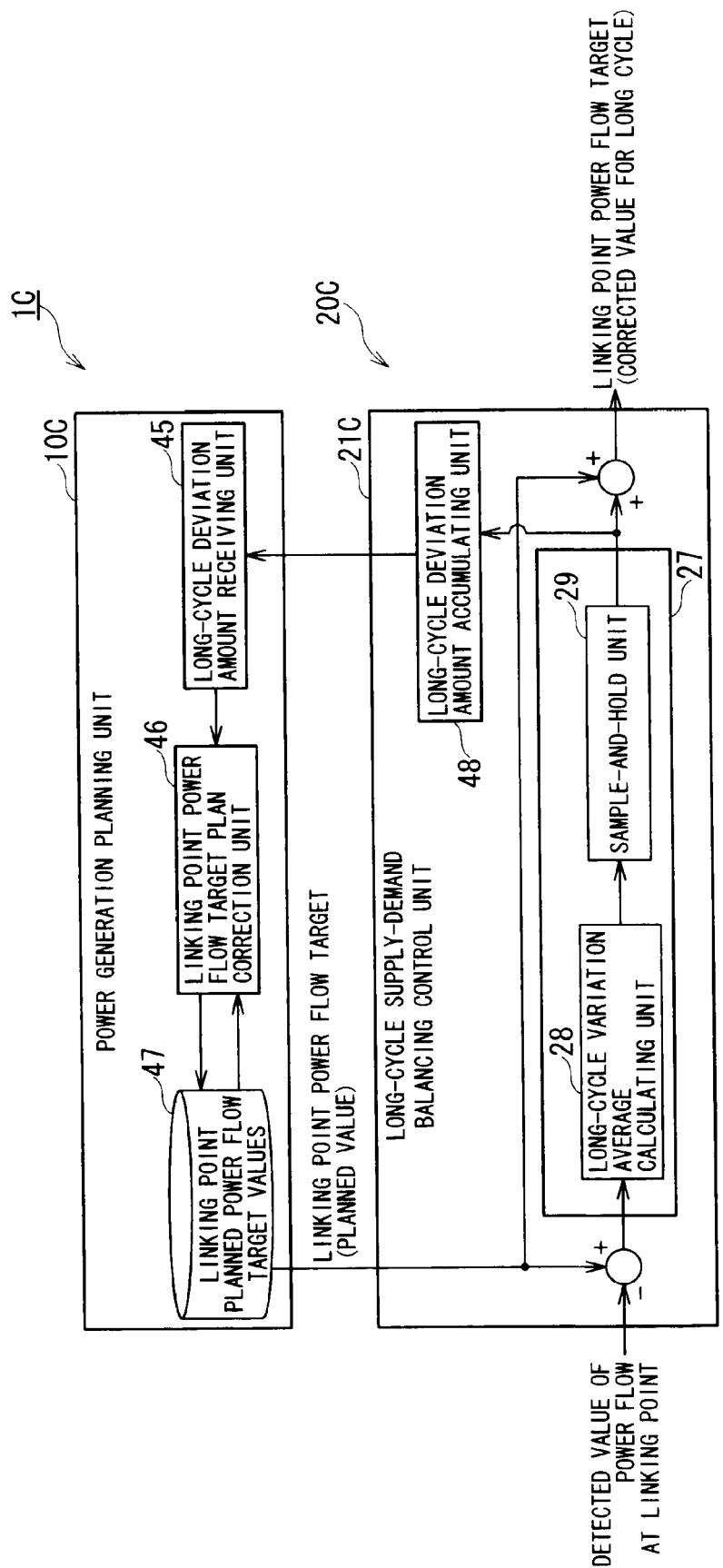
FIG. 6 is a block diagram schematically showing a configuration of a power supply and demand control apparatus according to a third embodiment of the present invention.

FIG. 6 is a block diagram schematically showing a configuration of the power supply and demand control apparatus (third power supply and demand control apparatus) 1C according to the third embodiment of the present invention, and more specifically, a power generation planning unit 10C and a long-cycle supply-demand balancing control unit 21C of the third power supply and demand control apparatus 1C.

The third power supply and demand control apparatus 1C is equipped with a power generation planning unit 10C and a long-cycle supply-demand balancing control unit 21C instead of the power generation planning unit 10A and the long-cycle supply-demand balancing control unit 21A of the long-cycle control unit 20A, but is otherwise substantially the same as the power supply and demand control apparatus 1A of the first embodiment. Thus, the present embodiment will be described, focusing on the power generation planning unit 10C and the long-cycle supply-demand balancing control unit 21C. Components substantially the same as those of the power supply and demand control apparatus 1A are denoted by the same reference numerals as the corresponding components of the power supply and demand control apparatus 1A of the first embodiment, and duplicated description thereof will be omitted herein.

The third power supply and demand control apparatus 1C shown in FIG. 6 includes the power generation planning unit 10C, a long-cycle control unit 20C (in FIG. 6, only the long-cycle supply-demand balancing control unit 21C is illustrated and other components are omitted), and the short-cycle control unit 30A, not shown in FIG. 6. As shown in FIG. 6, the power generation planning unit 10C is equipped with a long-cycle deviation amount receiving unit 45 and a linking point power flow target plan correction unit 46 and configured such that the linking point power flow target plan correction unit 46 will update linking point planned power flow target values (data) 47 based on deviation amount information received from the long-cycle deviation amount receiving unit 45.

On the other hand, the long-cycle control unit 20C includes the long-cycle supply-demand balancing control unit 21C, the power requirement calculating unit 22, the load power estimating unit 23, the natural energy output estimating unit 24 and the ELD unit 25. The long-cycle supply-demand balancing control unit 21C further includes the long-cycle correction value calculating unit 27 and a long-cycle deviation amount accumulating unit 48 which accumulates, as data, differences (hereinafter referred to as a long-cycle deviation amount) between the power flow target (planned values) inputted in the long-cycle supply-demand balancing control unit 21C and the detected values of power flow at the linking point 4.

That is, the long-cycle supply-demand balancing control unit 21C further includes the long-cycle deviation amount accumulating unit 48 when compared with the long-cycle supply-demand balancing control unit 21A shown in FIG. 3.

In the third power supply and demand control apparatus 1C configured as described above, the long-cycle deviation amount accumulating unit 48 of the long-cycle supply-demand balancing control unit 21C accumulates the long-cycle deviation amount together with date and time information every control cycle of the long-cycle supply-demand balancing control unit 21C (hereinafter, the data accumulated here is referred to as long-cycle deviation amount data). The long-cycle deviation amount data accumulated in the long-cycle deviation amount accumulating unit 48 is sent to the long-cycle deviation amount receiving unit 45 of the power generation planning unit 10C and used to correct planned power generation values for the next long cycle (e.g., next 30 minutes) or planned power generation values for the next day.

Upon receiving the long-cycle deviation amount data from the long-cycle deviation amount accumulating unit 48 of the long-cycle supply-demand balancing control unit 21C, the long-cycle deviation amount receiving unit 45 sends the received long-cycle deviation amount data to the linking point power flow target plan correction unit 46. The linking point power flow target plan correction unit 46 updates the information of the linking point planned power flow target values 47 based on the long-cycle deviation amount data received from the long-cycle deviation amount receiving unit 45.

That is, the linking point power flow target plan correction unit 46 corrects the linking point planned power flow target values for a specific time slot recorded in the linking point planned power flow target values (data) 47 so as to reduce the long-cycle deviations. Once the linking point planned power flow target values 47 have been corrected, the long-cycle control unit 20C and the short-cycle control unit 30A perform the control calculations so as to determine the power outputs of the respective distributed variable output power sources 61 to 6m based on the corrected linking point planned power flow target values.

In the followings, description will be given of a correction method used by the linking point power flow target plan correction unit 46 to correct the linking point planned power flow target values 47.

FIGS. 7A to 7D are explanatory diagrams outlining correction of the linking point planned power flow target values 47.

For example, if outputs of the natural energy generation apparatus 71 to 7n begin to differ from estimated output values of the natural energy generation apparatus 71 to 7n produced by the power generation planning unit 10C as shown in FIG. 7A, or if the load power of the power system 2 begins to differ from the load power estimated by the power generation planning unit 10C as shown in FIG. 7B, deviations (long-cycle deviations) occur between the electric power flow detected at the linking point 4 and an electric power flow target planned for the linking point 4 by the power generation planning unit 10C, as shown in FIG. 7C.

The long-cycle deviations are accumulated in the long-cycle deviation amount accumulating unit 48 and sent from the long-cycle deviation amount accumulating unit 48 to the linking point power flow target plan correction unit 46 via the long-cycle deviation amount receiving unit 45 of the power generation planning unit 10C. The linking point power flow target plan correction unit 46 calculates an integral (indicated by S1 in FIG. 7C) by integrating deviations between the electric power flow at the linking point 4 and the electric power flow target planned by the power generation planning unit 10C, using an integrator or the like, over 30 minutes which corresponds to the long cycle.

An initial planned value of the target value for the next 30 minutes planned by the power generation planning unit 10C is corrected by the amount equal to the 30-minute integral S1 calculated by the linking point power flow target plan correction unit 46, as shown in FIG. 7D. Specifically, the corrected planned value is determined such that an area (which corresponds to an amount of correction) surrounded by t1, t2, the initial planned value (t1 to t2 both inclusive), and the corrected planned value (t1 to t2 both inclusive) in FIG. 7D will be equal in size to the area S1 shown in FIG. 7C.

Next, the third power supply and demand control method will be described.

The third power supply and demand control method is performed, for example, as the third power supply and demand control apparatus 1C shown in FIG. 6 performs a power supply and demand control procedure (hereinafter referred to as a third power supply and demand control procedure). Individual processing steps of the third power supply and demand control procedure will be described below with reference to FIG. 6.

In addition to the steps of the first power supply and demand control procedure described above, the third power supply and demand control procedure further includes a long-cycle deviation amount accumulating step of accumulating a long-cycle deviations, a long-cycle deviation amount receiving step of receiving long-cycle deviation amount data accumulated in the long-cycle deviation amount accumulating step, and a linking point power flow target plan correction step of correcting the linking point planned power flow target values in a specific time slot based on the long-cycle deviation amount data received in the long-cycle deviation amount receiving step.

The long-cycle deviation amount accumulating step, the long-cycle deviation amount receiving step and the linking point power flow target plan correction step are carried out independently of the first power supply and demand control procedure.

Executing bodies and an execution sequence of the long-cycle deviation amount accumulating step, the long-cycle deviation amount receiving step and the linking point power flow target plan correction step are as shown in FIG. 6. Specifically, the long-cycle deviation amount accumulating unit 48 carries out the long-cycle deviation amount accumulating step, then the long-cycle deviation amount receiving unit 45 carries out the long-cycle deviation amount receiving step, and then, the linking point power flow target plan correction unit 46 carries out the linking point power flow target plan correction step, and consequently the power flow target of the linking point 4 is corrected.

According to the third embodiment of the present invention, since the linking point power target calculated by the power generation planning unit 10C can be corrected in advance so as to reduce the differences between the total power output and the load power of the power system 2 based on an increasing or decreasing trend of the deviations between the electric power (detected values) passing through the linking point 4 and the electric power flow target (planned values) planned by the power generation planning unit 10C, supply-demand balancing control performance of the long-cycle supply-demand balancing control unit 21C can be improved.

Incidentally, the installation locations of the long-cycle deviation amount receiving unit 45, the linking point power flow target plan correction unit 46 and the long-cycle deviation amount accumulating unit 48 are not limited to those described above, and may be selected freely as long as the capabilities described above can be realized. For example, the long-cycle deviation amount accumulating unit 48 may be installed in the power generation planning unit 10C instead of the long-cycle supply-demand balancing control unit 21C.

Fourth Embodiment

A power supply and demand control apparatus and power supply and demand control method (hereinafter referred to as a fourth power supply and demand control apparatus and fourth power supply and demand control method, respectively) according to a fourth embodiment of the present invention will be described hereunder with reference to FIGS. 8 and 9.

Figure 8:
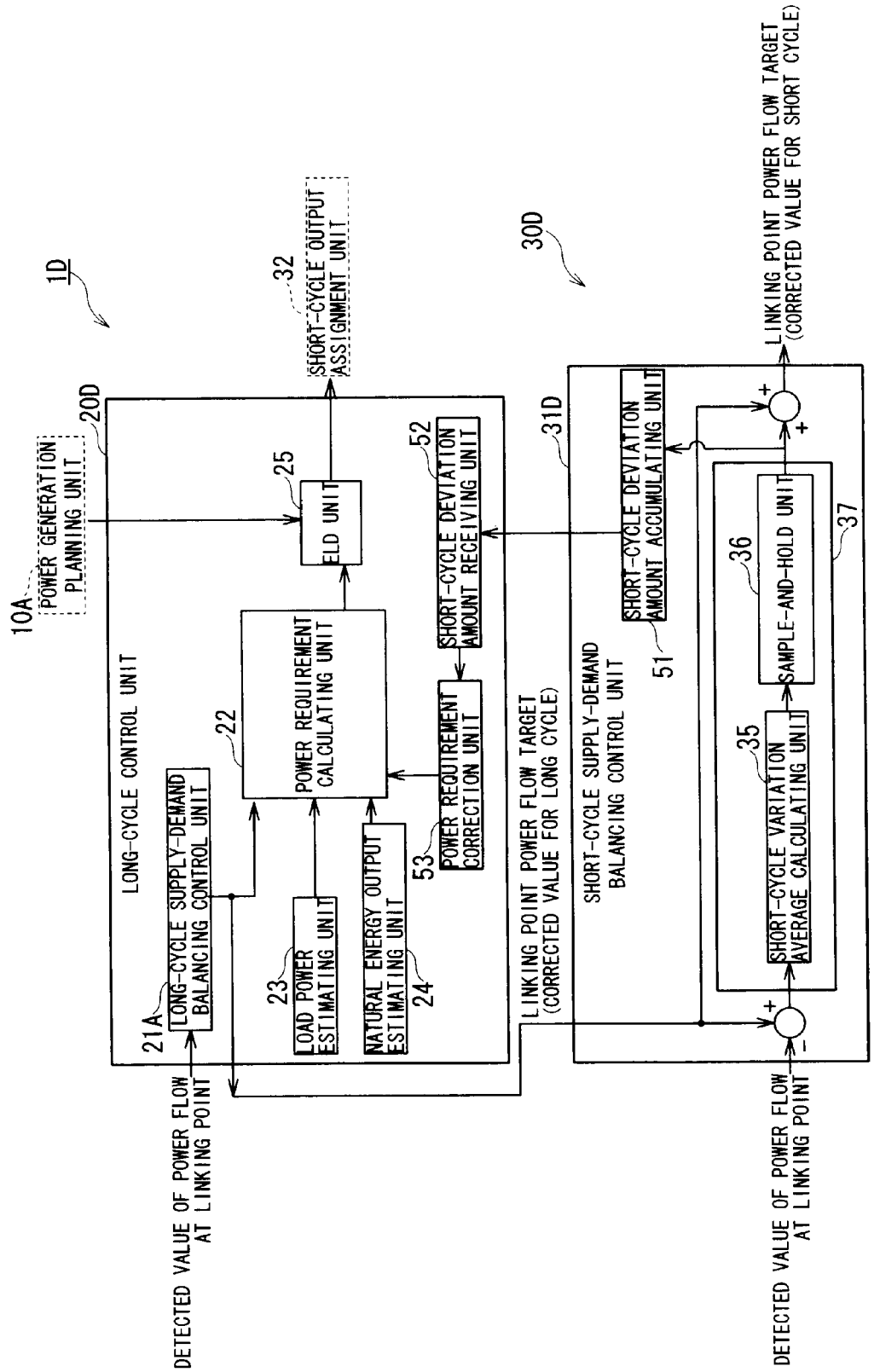
FIG. 8 is a block diagram schematically showing a configuration of a power supply and demand control apparatus according to a fourth embodiment of the present invention.

FIG. 8 is a block diagram schematically showing a configuration of the power supply and demand control apparatus (fourth power supply and demand control apparatus) 1D according to the fourth embodiment of the present invention, and more specifically, a long-cycle control unit 20D and a short-cycle supply-demand balancing control unit 31D of the fourth power supply and demand control apparatus 1D.

The fourth power supply and demand control apparatus 1D is equipped with a long-cycle control unit 20D and a short-cycle supply-demand balancing control unit 31D of a short-cycle control unit 30D instead of the long-cycle control unit 20A and the short-cycle supply-demand balancing control unit 31A of the short-cycle control unit 30A of the former embodiment, but is otherwise substantially the same as the power supply and demand control apparatus 1A. Thus, the present embodiment will be described by focusing on the long-cycle control unit 20D and short-cycle supply-demand balancing control unit 31D. Components substantially the same as those of the power supply and demand control apparatus 1A are denoted by the same reference numerals as the corresponding components of the power supply and demand control apparatus 1A, and duplicated description thereof will be omitted herein.

The fourth power supply and demand control apparatus 1D shown in FIG. 8 includes the power generation planning unit 10A, the long-cycle control unit 20D and the short-cycle control unit 30D. As shown in FIG. 8, the long-cycle control unit 20D of the fourth power supply and the demand control apparatus 1D further includes a short-cycle deviation amount receiving unit 52 and a power requirement correction unit 53 in addition to the long-cycle supply-demand balancing control unit 21A, the power requirement calculating unit 22, the load power estimating unit 23, the natural energy output estimating unit 24, and the ELD unit 25.

The short-cycle control unit 30D includes the short-cycle supply-demand balancing control unit 31D and the short-cycle output assignment unit 32. As shown in FIG. 8, the short-cycle supply-demand balancing control unit 31D further includes a short-cycle deviation amount accumulating unit 51 which accumulates, as data, differences (hereinafter referred to as a short-cycle deviation amount) between the power flow target (corrected values) of the linking point 4 outputted from the long-cycle control unit 20D and the electric power flow (detected values) actually detected at the linking point 4, in addition to including the short-cycle correction value calculating unit 37 which in turn includes the short-cycle variation average calculating unit 35 and sample/hold unit 36. The short-cycle deviation amount data is used for correction of the power requirements calculated by the power requirement calculating unit 22 of the long-cycle control unit 20D.

Among the components which differ from the power supply and demand control apparatus 1A, the short-cycle deviation amount accumulating unit 51 and the short-cycle deviation amount receiving unit 52 differ from the long-cycle deviation amount accumulating unit 48 and the long-cycle deviation amount receiving unit 45 (described above in the third embodiment) shown in FIG. 6 in that short-cycle deviation amounts are accumulated and received instead of the long-cycle deviation amounts. Otherwise, the short-cycle deviation amount accumulating unit 51 and the short-cycle deviation amount receiving unit 52 are substantially the same as the long-cycle deviation amount accumulating unit 48 and the long-cycle deviation amount receiving unit 45. That is, the short-cycle deviation amount accumulating unit 51 and the short-cycle deviation amount receiving unit 52 accumulate and receive the short-cycle deviation amounts, being provided with substantially the same capabilities as the long-cycle deviation amount accumulating unit 48 and the long-cycle deviation amount receiving unit 45, respectively.

The power requirement correction unit 53 corrects the power requirements for a specific time slot calculated by the power requirement calculating unit 22 so as to reduce the short-cycle deviations, based on the short-cycle deviation amount data received from the short-cycle deviation amount receiving unit 52. The power requirements have been corrected, the long-cycle control unit 20D (more specifically, the ELD unit 25) and the short-cycle control unit 30D (more specifically, the short-cycle output assignment unit 32) perform control calculations so as to determine the power outputs of the respective distributed variable output power sources 61 to 6m based on the corrected power requirements.

Next, a power requirement correction method performed by the power requirement correction unit 53 of the long-cycle control unit 20D will be described.

FIGS. 9A and 9B are explanatory diagrams outlining the power requirement correction performed by the power requirement correction unit 53.

As described above in the third embodiment, if outputs of the natural energy generation apparatus 71 to 7n cause difference from estimated output values of the natural energy generation apparatus 71 to 7n produced by the power generation planning unit 10C (see FIG. 7A), or if the load power of the power system 2 causes to difference from the load power estimated by the power generation planning unit 10C (see in FIG. 7B), the deviations (short-cycle deviations) occur between the electric power flow detected at the linking point 4 and the electric power flow target (corrected values) of the linking point 4 corrected by the long-cycle supply-demand balancing control unit 21A of the long-cycle control unit 20D.

The short-cycle deviations are accumulated in the short-cycle deviation amount accumulating unit 51 and sent from the short-cycle deviation amount accumulating unit 51 to the power requirement correction unit 53 via the short-cycle deviation amount receiving unit 52 of the power generation planning unit 10A. The power requirement correction unit 53 integrates the deviations using an integrator or the like as in the case of the linking point power flow target plan correction unit 46 described above in the third embodiment.

That is, the power requirement correction unit 53 calculates an integral (indicated by S2 in FIG. 9A) by integrating short-cycle deviations, which are differences between the power flow target (corrected values) of the linking point 4 outputted from the long-cycle control unit 20D and the electric power flow (detected values) detected at the linking point 4, over 5 minutes, which corresponds to the short cycle.

An initial planned value of the target value for the next 5 minutes planned by the power generation planning unit 10A is corrected by the amount equal to the 5-minute integral S2 calculated by the power requirement correction unit 53, as shown in FIG. 9B. Specifically, the corrected power requirement is determined such that an area (which corresponds to an amount of correction) surrounded by t3, t4, the initial planned value (t3 to t4 both inclusive), and the corrected planned value (t3 to t4 both inclusive) shown in FIG. 9B will be equal in size to the area S2 shown in FIG. 9A.

Next, the fourth power supply and demand control method will be described. The fourth power supply and demand control method is performed, for example, as the fourth power supply and demand control apparatus 1D shown in FIG. 8 performs a power supply and demand control procedure (hereinafter referred to as a fourth power supply and demand control procedure).

Individual processing steps of the fourth power supply and demand control procedure will be described below with reference to FIG. 8.

In addition to the steps of the first power supply and demand control procedure described above, the fourth power supply and demand control procedure further includes a short-cycle deviation amount accumulating step of accumulating a short-cycle deviations, a short-cycle deviation amount receiving step of receiving short-cycle deviation amount data accumulated in the short-cycle deviation amount accumulating step, and a power requirement correction step of correcting the power requirements (the total amount of power required to be generated by the distributed variable output power sources 61 to 6m) in a specific time slot based on the short-cycle deviation amount data received in the short-cycle deviation amount receiving step. The short-cycle deviation amount accumulating step, the short-cycle deviation amount receiving step, and the power requirement correction step are carried out independently of the first power supply and demand control procedure.

Executing bodies and an execution sequence of the short-cycle deviation amount accumulating step, the short-cycle deviation amount receiving step, and power requirement correction step are as shown in FIG. 8. Specifically, the short-cycle deviation amount accumulating unit 51 carries out the short-cycle deviation amount accumulating step, then the short-cycle deviation amount receiving unit 52 carries out the short-cycle deviation amount receiving step, and then the power requirement correction unit 53 carries out the power requirement correction step, and consequently the power output values inputted in the ELD unit 25 from the power requirement calculating unit 22 are corrected.

According to the fourth embodiment of the present invention, since the power output values calculated by the power requirement calculating unit 22 and inputted in the ELD unit 25 are corrected so as to reduce the differences between the total power output and the load power of the power system 2 based on increasing or decreasing trend of the deviations between the electric power passing through the linking point 4 and the electric power flow target (corrected values) corrected by the long-cycle supply-demand balancing control unit 21A of the long-cycle control unit 20D, the supply-demand balancing control performance of the short-cycle supply-demand balancing control unit 31D can be improved.

Incidentally, the installation locations of the short-cycle deviation amount accumulating unit 51, the short-cycle deviation amount receiving unit 52 and the power requirement correction unit 53 are not limited to those described above and may be selected freely as long as the capabilities described above can be realized. For example, the short-cycle deviation amount accumulating unit 51 may be installed in the long-cycle control unit 20D instead of the short-cycle supply-demand balancing control unit 31D.

As described above, since the present invention performs the control so as to ensure the supply-demand balancing of the electric energy at optional given location (such as the linking point 4 between the power system 2 to which the present invention is applied and the other power system 3) approximately every few tens of minutes as well as ensure the supply-demand balancing in shorter cycles (approximately every few minutes), the present invention can effectively ensure the supply-demand balancing even when applied to the small-scale power systems, such as microgrids, which are subject to large fluctuations in power generation.

Furthermore, since the long cycle, the long correction cycle, the short cycle, and the short correction cycle can be changed at the request of the user, the present invention enables the flexible supply-demand balancing control.

Still furthermore, since the electric power flow target of the linking point 4 can be corrected in advance so as to reduce the differences between the total power output and the load power of the power system 2 based on the increasing or decreasing trend of the deviations between the electric power (detected values) passing through the linking point 4 and the electric power flow target (planned values) of the linking point 4, the supply-demand balancing control performance of the long-cycle supply-demand balancing control unit can be improved.

Still furthermore, since the power output values (value of the total amount of power required to be generated by the distributed variable output power sources 61 to 6m) inputted to the ELD unit 25 from the power requirement calculating unit 22 are corrected so as to reduce the differences between the total power output and the load power of the power system 2 based on the increasing or decreasing trend of the deviations between the electric power (detected values) passing through the linking point 4 and the electric power flow target (corrected values) of the linking point 4, the supply-demand balancing control performance of the short-cycle supply-demand balancing control unit 31D can be improved.

It should be noted that the present invention is not limited to the embodiments described above, and many other changes and modifications may be made without departing from the scopes of the appended claims.

For example, the present invention may be implemented in various forms using different combinations of the components disclosed in the above embodiments or deleting some of the components disclosed in the embodiments.

The invention claimed is:

1. A power supply and demand control apparatus which adjusts power outputs of distributed power sources having adjustable power outputs out of a plurality of distributed power sources connected in a power system to thereby keep deviations between total power output and load power of the distributed power sources in the power system constant, the power supply and demand control apparatus comprising:
    a power generation planning unit that calculates one day's power output of each of the distributed power sources and a target for electric power flow at an electric power flow measuring location set arbitrarily;
    a first control unit that generates a control signal used to make the deviations between the total power output and the load power constant; and
    a second control unit that generates a control signal used to perform control for making the deviations between the total power output and the load power constant on a shorter cycle than a control cycle of the first control unit,
    wherein the first control unit comprises:
    a first supply-demand balancing control unit that corrects the electric power flow target calculated by the power generation planning unit so as to eliminate the deviations between the total power output of the distributed power sources and the load power in the power system to thereby ensure supply-demand balancing of electric energy in a given amount of time at the electric power flow measuring location,
    a load power estimating unit that estimates the load power,
    a non-variable output estimating unit that estimates power output of a non-variable output power source having power output not adjustable out of the distributed power sources installed in the power system,
    a power requirement calculating unit that calculates a required value of the total power output based on a target value of the electric power flow corrected by the first supply-demand balancing control unit, an estimated load power value produced by the load power estimating unit and an estimated power output value of the non-variable output power source produced by the non-variable output estimating unit, and
    an economical load dispatching (ELD) unit that determines economical load dispatching based on the required value of the total power output calculated by the power requirement calculating unit and produces respective power output command values for the plurality of distributed power sources; and
    the second control unit comprises:
    a second supply-demand balancing control unit that corrects and outputs the electric power flow target corrected by the first supply-demand balancing control unit so as to eliminate the deviations between the total power output of the distributed power sources and the load power of the power system and ensure the supply-demand balancing in a period shorter than a supply-demand balancing period ensured by the first supply-demand balancing control unit, and
    a short-cycle output assignment unit that allocates control amounts requested by the second supply-demand balancing control unit among the distributed power sources having the adjustable outputs.

2. The power supply and demand control apparatus according to claim 1, further comprising:
    a first supply-demand balancing control cycle setting unit that arbitrarily sets a control cycle used by the first supply-demand balancing control unit to ensure the supply-demand balancing; and
    a second supply-demand balancing control cycle setting unit that arbitrarily sets a control cycle of the second supply-demand balancing control unit within bounds of being shorter than the control cycle set by the first supply-demand balancing control cycle setting unit.

3. The power supply and demand control apparatus according to claim 1 or 2, further comprising:
    a first deviation amount accumulating unit that records deviations between the power flow target and a measured electric power flow at the electric power flow measuring location and sends the recorded results to the power generation planning unit;
    a first deviation amount receiving unit that receives a deviation amount sent from the first deviation amount accumulating unit; and
    a power flow target plan correction unit that corrects calculation results of the power flow target based on the deviation amount received from the first deviation amount receiving unit.

4. The power supply and demand control apparatus according to claim 1 or 2, further comprising:
    a second deviation amount accumulating unit that records the deviations between the corrected electric power flow target and a measured electric power flow at the electric power flow measuring location and sends recorded results to the first control unit, the electric power flow target having been corrected based on a control signal outputted from the first supply-demand balancing control unit;
    a second deviation amount receiving unit that receives a deviation amount sent from the second deviation amount accumulating unit; and
    a power requirement correction unit that corrects the required value of the total power output calculated by the power requirement calculating unit, based on the deviation amount received from the second deviation amount receiving unit.

5. A power supply and demand control method for adjusting power outputs of distributed power sources having adjustable power outputs out of a plurality of distributed power sources connected in a power system to thereby keep deviations between total power output and load power of the distributed power sources in the power system constant, the power supply and demand control method comprising:
    a power generation planning step of calculating one day's power output of each of the distributed power sources and a target for electric power flow at an electric power flow measuring location set in advance;
    a first control step of generating a control signal used to make the deviations between the total power output and the load power constant; and
    a second control step of generating a control signal used to perform control for making the deviations between the total power output and the load power constant on a shorter cycle than a control cycle of the first control step,
    wherein the first control step comprises:
    a first supply-demand balancing control step of correcting the electric power flow target calculated by the power generation planning step, so as to eliminate the deviations between the total power output of the distributed power sources and the load power in the power system to thereby ensure supply-demand balancing of electric energy in a given amount of time at the electric power flow measuring location, a load power estimating step of estimating the load power, a non-variable output estimating step of estimating power output of a non-variable output power source having power output not adjustable out of the distributed power sources installed in the power system, a power requirement calculating step of calculating a required value of the total power output based on a target value of power flow corrected by the first supply-demand balancing control step and an estimated power output value of the non-variable output power source produced by the non-variable output estimating step, and an economical load dispatching (ELD) step of determining economical load dispatching based on the required value of the total power output calculated by the power requirement calculating step and producing respective power output command values for the plurality of distributed power sources; and the second control step comprises:

a second supply-demand balancing control step of correcting and outputting the electric power flow target corrected by the first supply-demand balancing control step, so as to eliminate the deviations between the total power output of the distributed power sources and the load power of the power system and ensure supply-demand balancing in shorter periods than a supply-demand balancing period ensured by the first supply-demand balancing control step, and a short-cycle output assignment step of allocating control amounts calculated in the second supply-demand balancing control step among the distributed power sources having adjustable power outputs.

* * * * *